United States Patent
Xiang et al.

(10) Patent No.: US 8,417,703 B2
(45) Date of Patent: Apr. 9, 2013

(54) DATA SEARCHING USING SPATIAL AUDITORY CUES

(75) Inventors: Pei Xiang, San Diego, CA (US); Manish Mahajan, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 12/905,340

(22) Filed: Oct. 15, 2010

(65) Prior Publication Data

US 2011/0106825 A1 May 5, 2011

Related U.S. Application Data

(60) Provisional application No. 61/257,684, filed on Nov. 3, 2009.

(51) Int. Cl.
*G06F 3/16* (2006.01)
*G06F 17/30* (2006.01)

(52) U.S. Cl.
USPC .............................. 707/736; 707/916; 715/727

(58) Field of Classification Search .................. 715/727; 707/736, 916
See application file for complete search history.

(56) References Cited

U.S. PATENT DOCUMENTS

| | | | |
|---|---|---|---|
| 6,708,172 B1 * | 3/2004 | Wong et al. ........................... | 1/1 |
| 6,965,770 B2 * | 11/2005 | Walsh et al. ................ | 455/426.1 |
| 7,516,406 B1 * | 4/2009 | Cameron ..................... | 715/710 |
| 2004/0064209 A1 * | 4/2004 | Zhang ............................... | 700/94 |
| 2005/0075862 A1 * | 4/2005 | Paulin .............................. | 704/203 |
| 2007/0083323 A1 * | 4/2007 | Rosenberg .................... | 701/200 |
| 2008/0025529 A1 * | 1/2008 | Keohane et al. .............. | 381/104 |
| 2009/0204584 A1 * | 8/2009 | Harada .............................. | 707/3 |
| 2009/0327968 A1 * | 12/2009 | Porat et al. ..................... | 715/841 |
| 2010/0306657 A1 * | 12/2010 | Derbyshire et al. .......... | 715/727 |

OTHER PUBLICATIONS

Lokki et al., Navigation with Auditory Cues in a Virtual Environment, 2005, IEEE Computer Society, pp. 80-86.*
Yalla, Pavani and Walker, Bruce N.; "Advanced Auditory Menus: Design and Evaluation of Auditory Scroll Bars"; ASSETS'08, Oct. 13-15, 2008, Halifax, Nova Scotia, Canada.
Yalla, Pavani and Walker, Bruce N.; "Advanced Auditory Menus", poster paper; International Conference on Auditory Display (ICAD 08), Jun. 23-27, 2008 Paris, France.

(Continued)

*Primary Examiner* — Jorge A Casanova
(74) *Attorney, Agent, or Firm* — Espartaco Diaz Hidalgo

(57) ABSTRACT

Spatial auditory cues are produced while a user searches a database for stored information. The spatial auditory cues assist the user in quickly locating stored information by producing sounds that are perceived at specific physical locations in space around the user as the search proceeds. Each location may be associated with different information. Thus, using the techniques disclosed herein, a user can more easily recall stored information by remembering the locations of sound produced by particular spatial auditory cues. The spatial auditory cues may be used in conjunction with a visual search interface. A method of producing auditory cues includes receiving a search action at a user interface included in a device, translating the search action into a spatial auditory cue corresponding to a specific location within a space, and rendering the spatial auditory cue as an audio output signal.

41 Claims, 10 Drawing Sheets

OTHER PUBLICATIONS

Andreja Andric et al: "Music Mood Wheel Improving Browsing Experience on Digital Content through an Audio Interface", Automated Production of Cross Media Content for Multi-Channel Distribu Tion, 2006. AXMEDIS '06. Second International Conference on, IEEE, Pl, Dec. 1, 2006, pp. 251-257, XP031033733, ISBN: 978-0-7695-2625-6 the whole document.

Goose S et al: "A 3D Audio only Interactive Web Browser: Using Spatialization to Convey Hypermedia Document Structure", Proceedings / ACM Multimedia 99 : [The 7th ACM International Multimedia Conference] ; Orlando, Florida, Oct. 30-Nov. 5, 1999, ACM, New York, NY, Jan. 1, 1999, pp. 363-371, XP002523206, ISBN: 978-1-58113-151-2 the whole document.

International Search Report and Written Opinion—PCT/US2010/054249—International Search Authority, European Patent Office,Feb. 3, 2011.

Zhou Z et al: "An experimental study on the role of software synthesized 3D sound in augmented reality environments", Interacting With Computers, Butterworth-Heinemann, GB, vol. 16, No. 5, Oct. 1, 2004, pp. 989-1016, XP004638967, ISSN: 0953-5438, DOI: DOI:10.1016/J.INTCOM.2004.06.014 the whole document.

* cited by examiner

DATA SEARCHING USING SPATIAL AUDITORY CUES

CLAIM OF PRIORITY UNDER 35 U.S.C. §119

The present application for patent claims priority to Provisional Application No. 61/257,684 entitled "DATA SEARCHING USING SPATIAL AUDITORY CUES" filed Nov. 3, 2009, and assigned to the assignee hereof.

BACKGROUND

1. Field

The present disclosure pertains generally to electronic information searching, and more specifically, to a search interface that relies on auditory indicators.

2. Background

Electronic database searches are usually performed visually. In some database interfaces, the database contents are presented on a display and a user can visually search or browse an index of the information contained in the database.

Database indexes may be organized hierarchically. A hierarchical database organization allows database contents to be categorized into groups of related information, such as folders, genres, or the like. This may permit more efficient searching. However, even with categorization, the number of items in each category may still be very large, and thus, potentially inconvenient to browse.

When a device is portable and small, i.e., display space is limited, a user may need to navigate through many layers of indexes, menus and/or folders to retrieve desired information or content from an electronic database. This may be time consuming and cumbersome in some circumstances.

SUMMARY

To improve searching capabilities, the techniques and database interfaces disclosed herein employ spatial auditory cues. Spatial auditory cues are produced while a user searches a database for stored information. The spatial auditory cues assist the user in quickly locating stored information by generating sounds that are perceived at specific physical locations in space around the user as a search proceeds. Each location may be associated with different information. Thus, using the methods, articles and/or apparatuses disclosed herein, a user can more easily recall stored information by remembering the locations of sound produced by particular spatial auditory cues. In addition, in larger databases, the need for layers of database indexes, menus and/or folders can be reduced or eliminated.

As the database content size gets larger, browsing an index with many items becomes a problem, especially when a device display is relatively small. Only a limited number of items can be displayed on one screen. Using spatial audio technologies, browsing database items is made easier and more intuitive, and the conventional process of visually searching may be enhanced.

According to an aspect, a method of producing auditory cues includes receiving a search action at a user interface included in a device, translating the search action into a spatial auditory cue corresponding to a location within a space, and rendering the spatial auditory cue as an audio output signal.

According to another aspect, a method of interfacing with a database includes visually displaying on a device at least a portion of a scrollable list of items stored in the database and mapping at least some of the items to spatial auditory cues corresponding to locations within a predefined space. Each of the spatial auditory cues corresponds to a respective, distinct location within the space. The list may be scrolled. As a result of scrolling the list, at least one of the spatial auditory cues is rendered as an audio output signal.

According to another aspect, an apparatus includes a user interface configured to receive a search action, a spatial cue generator configured to translate the search action into a spatial auditory cue corresponding to a location within a space, and an audio rendering engine configured to render the spatial auditory cue as audio output.

According to a further aspect, an apparatus includes means for receiving a search action, means for translating the search action into a spatial auditory cue corresponding to a location within a space, and means for rendering the spatial auditory cue as an audio output signal.

According to a further aspect, a computer-readable medium, embodying a set of instructions executable by one or more processors, includes code for receiving a search action at a user interface included in a device, code for translating the search action into a spatial auditory cue corresponding to a location within a space, and code for rendering the spatial auditory cue as audio output.

Other aspects, features, and advantages will be or will become apparent to one with skill in the art upon examination of the following figures and detailed description. It is intended that all such additional features, aspects, and advantages be included within this description and be protected by the accompanying claims.

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the auditory cueing techniques described herein. In the figures, like reference numerals designate corresponding parts throughout the different views.

DETAILED DESCRIPTION

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

The word "exemplary" is used throughout this disclosure to mean "serving as an example, instance, or illustration." Anything described herein as "exemplary" is not necessarily to be construed as preferred or advantageous over other approaches or features.

Unless expressly limited by its context, the term "coupled" is used to indicate a direct or indirect electrical or physical connection. If the connection is indirect, it is well understood by a person having ordinary skill in the art, that there may be other blocks or components between the structures being "coupled". The term "configuration" may be used in reference to a method, apparatus/device, and/or system as indicated by its particular context. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). In the case (i) where A is based on B includes based on at least, this may include the configuration where A is coupled to B. The term "at least one" is used to indicate any of its ordinary meanings, including "one or more".

The terms "apparatus" and "device" are used generically and interchangeably unless otherwise indicated by the particular context. Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The terms "method," "process," "procedure," and "technique" are used generically and interchangeably unless otherwise indicated by the particular context. The terms "element" and "module" are typically used to indicate a portion of a greater configuration.

Figure 1:
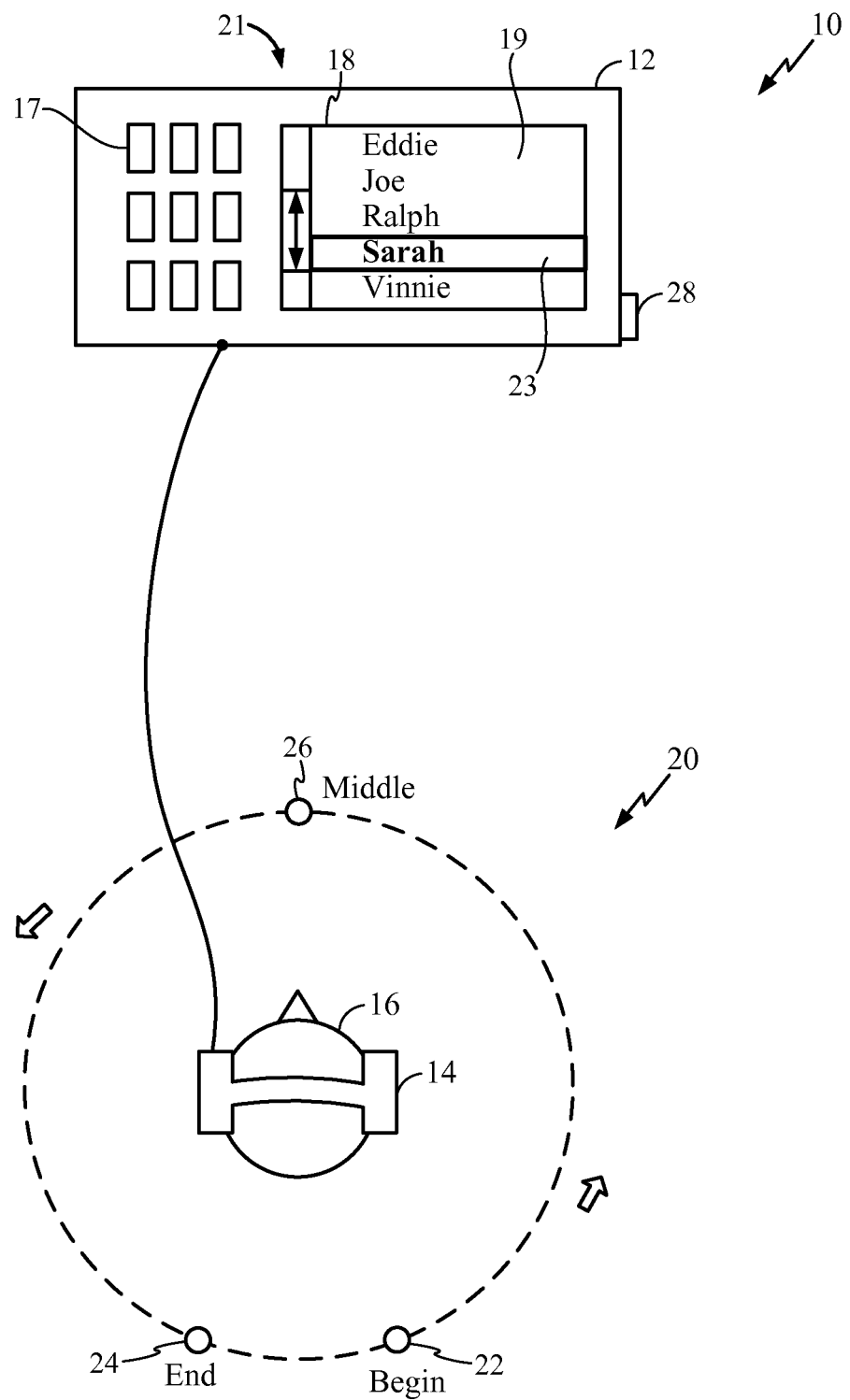
FIG. 1 is a diagram illustrating an exemplary system for database searching using spatial auditory cues.

FIG. 1 is a diagram illustrating an exemplary system 10 for performing searches using spatial auditory cues. The system 10 includes a portable device 12 coupled to an audio output device, such as a headset 14.

The headset 14 includes multiple speakers that are configured to produce sounds that may be perceived by a user 16 at different physical locations in the space 20 around the user 16. The exemplary headset 14 includes two earpieces and at least one support, such as a headband, for allowing the headset to be comfortably worn by the user 16. In the example shown, the headset 14 is a wired headset, having a conductor carrying audio signals between the device 12 and the headset 14. Alternatively, the headset 14 may be a wireless headset, such as a Bluetooth headset, in which audio signals between the device 12 and headset 14 are carried over one or more wireless radio frequency (RF) or infrared (IR) channels. If implemented as a Bluetooth wireless headset, the headset 14 and device 12 can include components and functionality as defined by the Bluetooth Specification available at www.bluetooth.com. The Bluetooth Specification provides specific guidelines for providing wireless headset functionality.

The portable device 12 may be any device capable of producing audio output and performing the functions disclosed herein. For example, the device 12 may be a handheld device, such as a wireless communication device, for example, a cellular phone, personal digital assistant (PDA) or the like. The portable device 12 may also be an MP3 player, gaming device, laptop computer, personal stereo or the like. Although illustrated as being a portable device in FIG. 1, the device 12 may alternatively be implemented as a non-portable device. For example, the spatial auditory cueing techniques described herein may also be used with multichannel speakers in home theater systems.

The portable device 12 includes a user interface 21 comprising, in this example, a keypad 17 having one or more buttons, a display 18 and a rocker push button 28. The display 18 may be any suitable device for visually displaying information, such as a liquid crystal display (LCD) screen or the like. As shown in FIG. 1, the display 18 can present, among other things, a scrollable list 19 of data items stored in a database. The user interface 21 may provide a graphical user interface for visually scrolling through a list of items stored in the database. In this example, the list is a contact list of names from an address book. The database can store the names, as well as information related to the names, such as addresses, phone numbers or the like. The user interface 21 is only one example of possible user interfaces that may be used. For example, the push button 28 and the keypad 17 may be integrated together, or may be implemented using a touch screen, rather than actual buttons.

In the address book example of FIG. 1, the user interface 21 can be implemented where the push-button switch 28 is a momentary contact, rocker push-button switch, having two internal switches (not shown), one for scrolling the list 19 forward and the other position for scrolling the list 19 backwards. The user interface 21 can be configured so that when the user 16 momentarily rocks the switch 28 to depress one of the internal switches, the user interface 21 provides a single step, item-by-item accurate browse through the list 19, and a corresponding spatial auditory cue is presented each time the internal switch is pressed. Alternatively, when the user 16 presses and holds either of the internal switches, a fast scroll is initiated, causing the visually displayed list items to scroll very quickly and the sounds caused by the spatial auditory cues move relatively quickly about the space 20. The user 16 can continue to hold the switch until the user's hearing tells him/her that the search target is near, based on the location of the spatial auditory cue sounds. Other types of switches may be used for the push button 28.

The user 16 may browse the list 19 by using the push button 28 to scroll up or down the displayed list 19. As the user scrolls through the displayed list 19, the portable device 12 generates spatial auditory cues. The spatial auditory cues assist the user in quickly locating stored information by causing sounds to be produced by the headset 14 that are perceived at different physical locations in the space 20 around the user 16 as the search proceeds. A spatial auditory cue may be a signal and/or information that can be rendered into audio output that produces sound at a particular physical location relative to a listener. Each location may be associated with a specific information item or record in the database. Generally, as used herein, the term "spatial auditory cue" may refer to an audible sound generated by a system so that a listener perceives the sound emanating from a particular location, or alternatively, to the electronic data/signals necessary to generate such sound.

The system 10 maps the relative locations of items in the database to corresponding spatial location in either two-dimensions or three-dimensions within the space 20 around the user 16. The space 20 may include spatial regions referred to as the audio space, the auditory space, the audio search space, or the 3D sonic space. The space 20 may have other names or labels, it should be understood that the space 20 encompasses spatial locations around the user 16. Linearly browsing database contents visually on the display 18 can be accompanied by their mapped audio events perceived by the user 16 in the space 20. Thus, the user not only visually sees listed items on the display 18, but may also listen to some sounds, such as thumbnail short audio clips of the audio/video content indexed in the database, and also hears the sounds emanated from specific physical locations in the space 20. Similar to remembering where one book is located on a bookshelf, with the additional spatial auditory cues, database items can be searched more easily.

In the example shown, the system 10 maps the contact names to spatial locations in the space 20 around the user 16. The user may also be the listener. An example of a coarse mapping is illustrated in FIG. 1. In the auditory space 20 around the listener, each contact is mapped to a location around the listener's head 16. For example, a contact whose last name begins with "A" may be mapped to a "begin" location 22 that is audibly perceived at the right rear of the user 16. A contact whose last name begins with a letter in the middle of the alphabet, such as, for example, the letter "M", may be mapped to a "middle" location 26 that is audibly perceived at in front of the user 16; and a contact whose last name start with the letter "Z" may be mapped to an "end" location 24 that is audibly perceived at the left rear of the user 16.

Whenever visually browsing to find a specific contact name in the list 19, the currently selected name may be represented visually with a highlighted text line 23 on the display 18. From the user's 16 perspective, a short sound event, e.g. a click sound, audio clip or the like, may be generated and rendered at this item's designated spatial location, which is perceived by the user 16 in the space 20. When quickly scrolling through the list 19 of items, the sounds may become a relatively continuous stream, moving in the space 20. During fast scrolling, it is relatively difficult for some users to visually track scrolling text on the display 18, but it is generally not as difficult to aurally track the moving sound in the space 20. By hearing noises at locations associated with the database items, the user 16 can tell whether he/she is approximately near the target item being searched for. Then, as the user 16 hears the spatial auditory output approaching the items auditory cue location in the space 20, he/she may slow down and browse item-by-item visually on the display 18 to visually find the target. If this function is used often, the user usually can remember approximate spatial locations of certain contact names, and thus, reach the exact position more quickly using the combination of spatial auditory cues and visual display.

The spatial auditory cue output presented in the 3D sonic space 20 can be rendered using different techniques, some of which are known in the art. For example, for the headset 14, which includes headphones, head-related transfer function (HRTF)-style filters can be used to render mono-sound sources into virtual locations. For speakerphone users, virtual surround sound can also be achieved through stereo speakers, e.g., two speakers in front of the listener 16; and for multi-channel speaker listeners, sounds can be panned and mixed, so that they are physically emanated from different directions in the space around the listener 16.

The address book use case given above is just one example of direct mapping a database index into an auditory space. Alternative or enhanced mappings of listed items to auditory space can be implemented. For example, contact names in the list 19 maybe grouped by categories, for example, with a classmates category generating spatial auditory cues that cause sounds perceived by the listener 16 at his/her left rear, and with a relatives category generating spatial auditory cues that cause sounds perceived by the user 16 in the center front area of the space, and so forth.

The system 10 can be configured to "scale" the spatial auditory cues based on the speed of a search being performed by the user 16. Scaling allows the audio signal representing the spatial auditory cues to include a different amount and/or type of audio information for each listed item in a database, which audio information is presented at the auditory cues' corresponding spatial locations. On a detailed scale, or "zoomed in" scale, when the user 16 browses the list 19 slowly, the spatial auditory cues may present audio excerpts (i.e., audio clips) of each item in the list 19. On a macroscopic scale, or "zoomed out" scale, when the user 16 browses the list 19 quickly, each spatial auditory cue may be represented by a more abstract sound event, such as one synthesized click. The change in the listener-perceived location of a stream of click sounds in the auditory space 20 navigates the user 16 through the database index, virtually indicating where the user 16 is while searching the database. An additional benefit is that, each database item, when defined properly, is assigned a specific location in auditory space, so that it provides a physical cue of where it is. By remembering its approximate spatial location, the user 16 may find it next time more easily. This benefit is more prominent when the user input method is limited, e.g., on a hand held device, where it takes relatively more time to input text strings for text searching.

An advantage of the system 10 is that it combines the advantages of using both visual and auditory senses in searching for indexed database items. Vision is very good for detail and resolution, but relatively slow in speed when scanning large data sets, and also requires greater focus by an individual. Audio senses are generally not as good for detail and resolution, but can be used to coarsely process relatively large amounts of information in a relatively short time. In addition, most people are acutely aware of audio events occurring concurrently with visual events.

In the example illustrated by FIG. 1, the database stores an address book of contact names. It should be understood that the techniques disclosed herein are not limited to any particular type of database or stored content. The disclosed searching techniques, methods and devices may be used for other types and arrangements of stored information, such as media libraries, other structures of relational databases, and the like.

Figure 2:
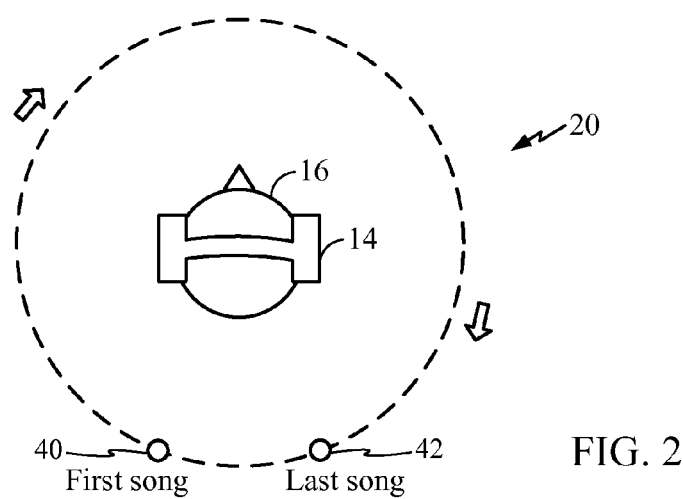
FIGS. 2-4 are top-down views illustrating exemplary configurations of example spatial auditory cues located in space surrounding a user.
Figure 3:
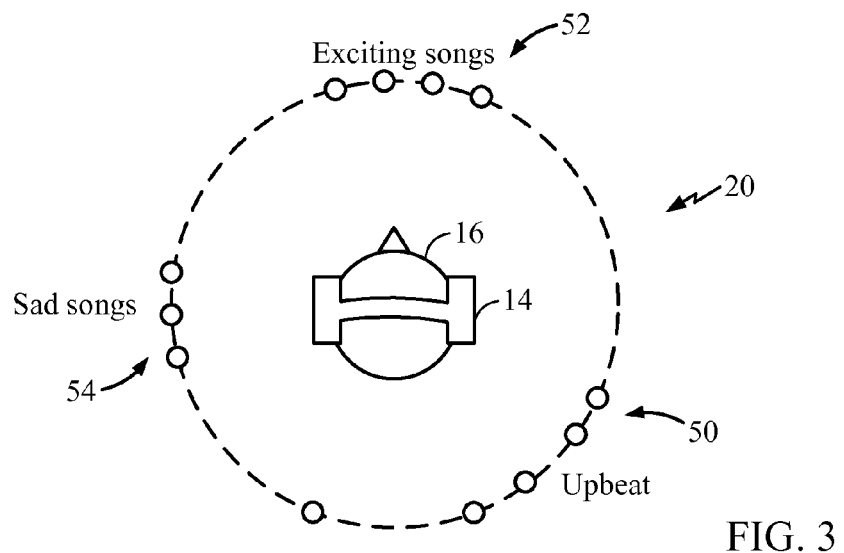
Figure 4:
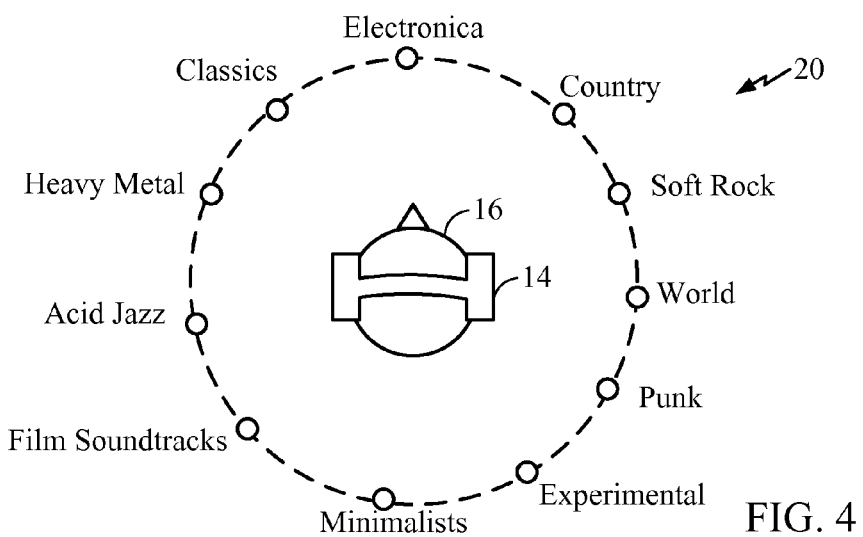

FIGS. 2-4 are top-down views illustrating certain exemplary configurations of the auditory space 20 surrounding the listener 16. The examples shown in FIGS. 2-4 represent only a subset of possible auditory space configurations.

FIG. 2 depicts the space 20 where the system 10 is configured to present the spatial auditory cues so that the listener 16 perceives the audio output as moving counter-clockwise through the space 20 around him/her as the list 19 of items is scrolled in a particular direction. This is a lineal configuration of the audio search space. For example, the listener 16 may browse through a folder accessible to the portable device 12 containing a plurality of songs, e.g., one hundred songs or more, by listening to a thumbnail audio excerpt of each song and then jumping to the excerpt of the next song. The system 10 may be configured so that the audio excerpt of the first song in the folder is output by the headset 14 so that it is perceived by the listener 16 near the left rear direction relative to the listener 16, at a first song location 40. During browsing, as the listener 16 skips to the next song in a list and so on, the listener perceives location of each played back song excerpt as changing gradually in a clockwise (or counterclockwise) circular path. As the listener 16 browses down the list of songs, the perceived location of the excerpt moves for each song title, until reaching the last song on the list, where the perceived location is the last song location 42, located near the rear right direction relative to the listener's position illustrated in FIG. 2. In this way, the whole folder of songs is presented in a manner that is analogous to albums being put on a circularly-shaped bookshelf, where the perceived location of the sound helps the listener 16 remember what that song is and where it is located in the folder list. The spatial auditory cues generated by the example configuration of FIG. 2 may also be scaled, depending on the speed of a search conducted by the listener 16. It should be noted that the perceived location of each played back song may be either clock-wise or counter-clockwise.

By example, while using the configuration of FIG. 2, as the listener 16 browses near the end of the folder, i.e., the spatial auditory cue sounds emanate from right or rear right in the space relative to him/her. While browsing this portion of the list of songs, the listener 16 may remember that there is a song located on his/her left that he/she may now want to hear. In this event, the listener 16 may press and hold the button 28 to quickly browse in reverse. Now, the spatial auditory cue for each song is scaled to become a short click, and as the listener 16 quickly reverse browses through the library, the listener 16 perceives a stream of audio clicks moving through the space 20 from his/her right side to his/her left in a circular manner. When the listener 16 perceives the audio clicks in the approximate left location of the desired song, the listener 16 may slow down the browsing by releasing the button 28, and single clicking the button 28 to scroll more slowly through the list, listening to audio excerpts of each song again, instead of the audio clicks, until the desired song is found.

Alternatively, database items, such as media content, can be assigned auditory spatial locations according to other criterion, such as the type or class of information indicated by the item. FIGS. 3 and 4 illustrate exemplary auditory space configurations where the auditory space 20 is divided according to different categories of information. For example, as shown in FIG. 3, a library of music can be arranged in the auditory space 20 according to the mood of the songs contained in the library. As shown in FIG. 3, songs of different moods are put in different, corresponding spatial regions, so that if the listener 16 is searching for a certain mood of music, the listener can search in the specific auditory space for the particular desired mood of music. In the example, the system 10 is configured to generate spatial auditory cues for "sad songs" (which may be stored in an electronic folder labeled such) in a specific region 54 of the space 20 that is generally perceived to the left of listener's position shown in FIG. 3. The system 10 may also be configured to generate spatial auditory cues for "exciting songs" (which may be stored in an electronic folder labeled such) in a different region 52 of the space 20 that is generally perceived by the listener 16 in front of listener's position shown in FIG. 3; and the system 10 may also be configured to generate spatial auditory cues for "upbeat songs" (which may be stored in an electronic folder labeled such) in a third region 50 of the space 20 that is generally perceived by the listener 16 to the right rear of listener's position shown in FIG. 3.

In another exemplary configuration, the system 10 can be configured so that database items can correspond to spatial auditory cues that are arranged according to the genres of the items, as shown in FIG. 4. In FIG. 4, a music library can be arranged in the auditory space 20 according to the types of songs contained in the library. As shown in FIG. 4, songs of different genres are associated with different, corresponding spatial regions, so that if the listener 16 is searching for a certain type of music, the listener can search in the specific auditory space for the particular desired genre. In the example of FIG. 4, the system 10 generates spatial auditory cues in specific regions of the space 20 for film soundtracks, heavy metal, classics and so forth. Thus, in the example of FIG. 4, if the listener 16 is browsing, for example, "electronica" songs on the display 18, the system 10 may generate corresponding spatial auditory cues, e.g., song excerpts, that are perceived by the listener 16 as being in front of him/her.

The spatial auditory cues generated by the example configurations of FIGS. 3-4 may also be scaled, depending on the speed of a search conducted by the listener 16.

The system 10 can also be configured so that database browsing can occur about the 3-D space surrounding the listener 16. In this configuration, the spatial auditory cues use the entire spherical space surrounding the listener 16 to represent items. For example, a vertical spatial region could be used to browse a sub-category inside a category (see FIG. 5 and FIG. 6). In this configuration, the category is located in a corresponding horizontal spatial region about the listener 16. In the 3-D configuration, the listener 16 may know the approximate horizontal (left to right) location for particular songs beginning with a certain letter, e.g., "S". Songs beginning with this letter may themselves be numerous and sub-categorized vertically (as in FIG. 5 and FIG. 6) in the 3-D auditory space corresponding to the horizontal spatial region for the letter "S".

Figure 5:
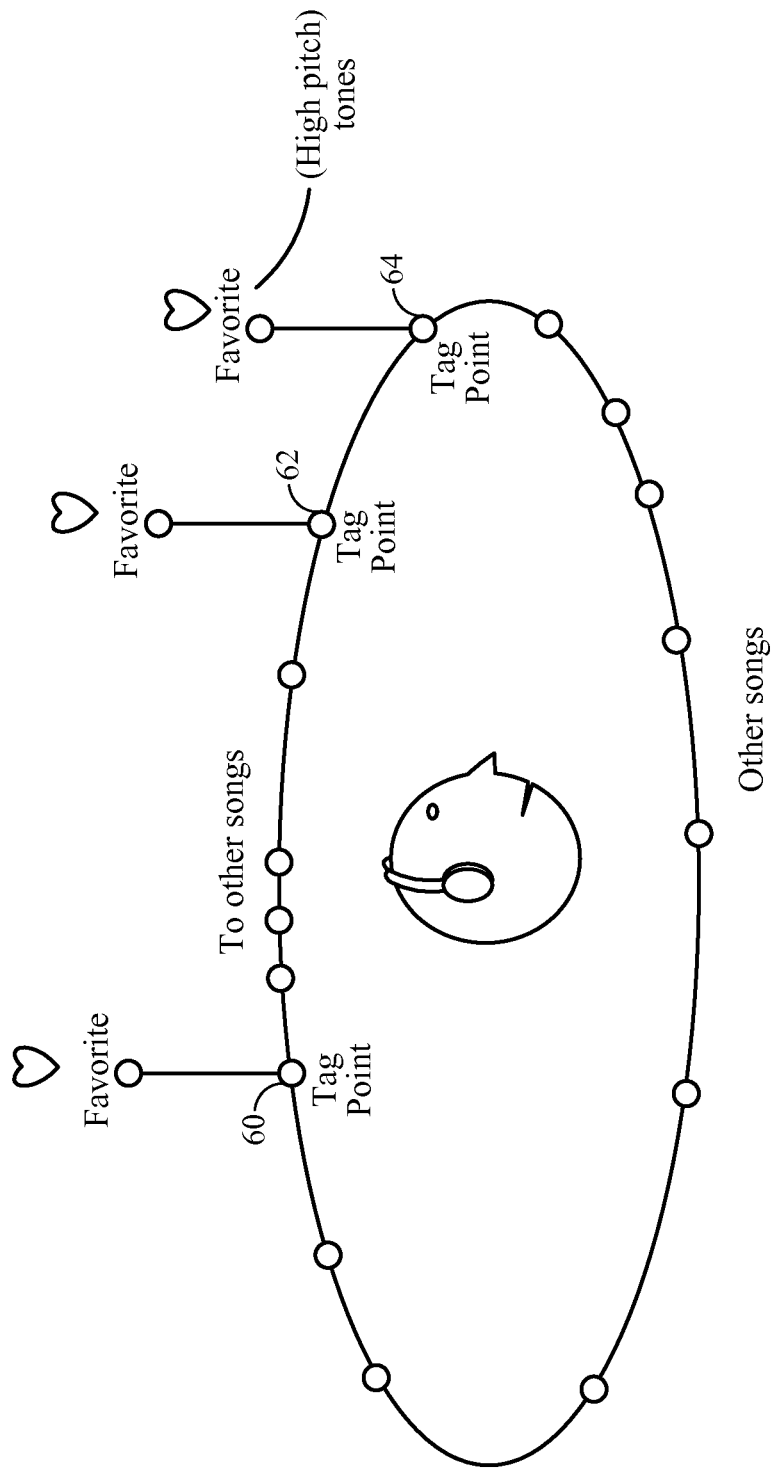
FIG. 5 is a diagram illustrating an exemplary configuration example of spatial auditory cues as tag points.

One way to switch from a parent category to a child category (also called a sub-category) is to switch from a horizontal spatial region to a vertical spatial region once a tag point is played. Similarly, categories may initially be located in a vertical spatial region, and once a tag point is reached, the listener may hear sub-categories in a horizontal spatial region. A horizontal or vertical spatial region may be a plane in space. Alternatively, it should also be recognized that off-axis (not necessarily horizontal-axis or vertical-axis) spatial regions may also be used instead of horizontal and vertical spatial regions. For example, a first off-axis spatial region may contain categories, and once a tag point is reached, a set of sub-categories may be located in a second off-axis spatial region that is perpendicular to the first off-axis spatial region. A tag point may be pre-programmed or created by the user by specifying a search criteria. A multi-modal user interface may be used to enter such criteria. FIG. 5 is a diagram illustrating an exemplary configuration example of spatial auditory cues as tag points. The tag point may be labeled, for example "Favorite". The search criteria may be robust. If the item in the list being searched is a song, the search criteria may be, for example, "songs greater than five (5) minutes in duration" or "songs older than 1970". A combination of search criteria may also be used to create a tag point. The user may also have control over defining the indicatory tone/volume of the tag point. That is, the tag point may have a different sounding auditory cue than the other items in the same spatial orientation. In FIG. 5, "Favorite" is illustrated as having a high pitch tone.

Figure 6:
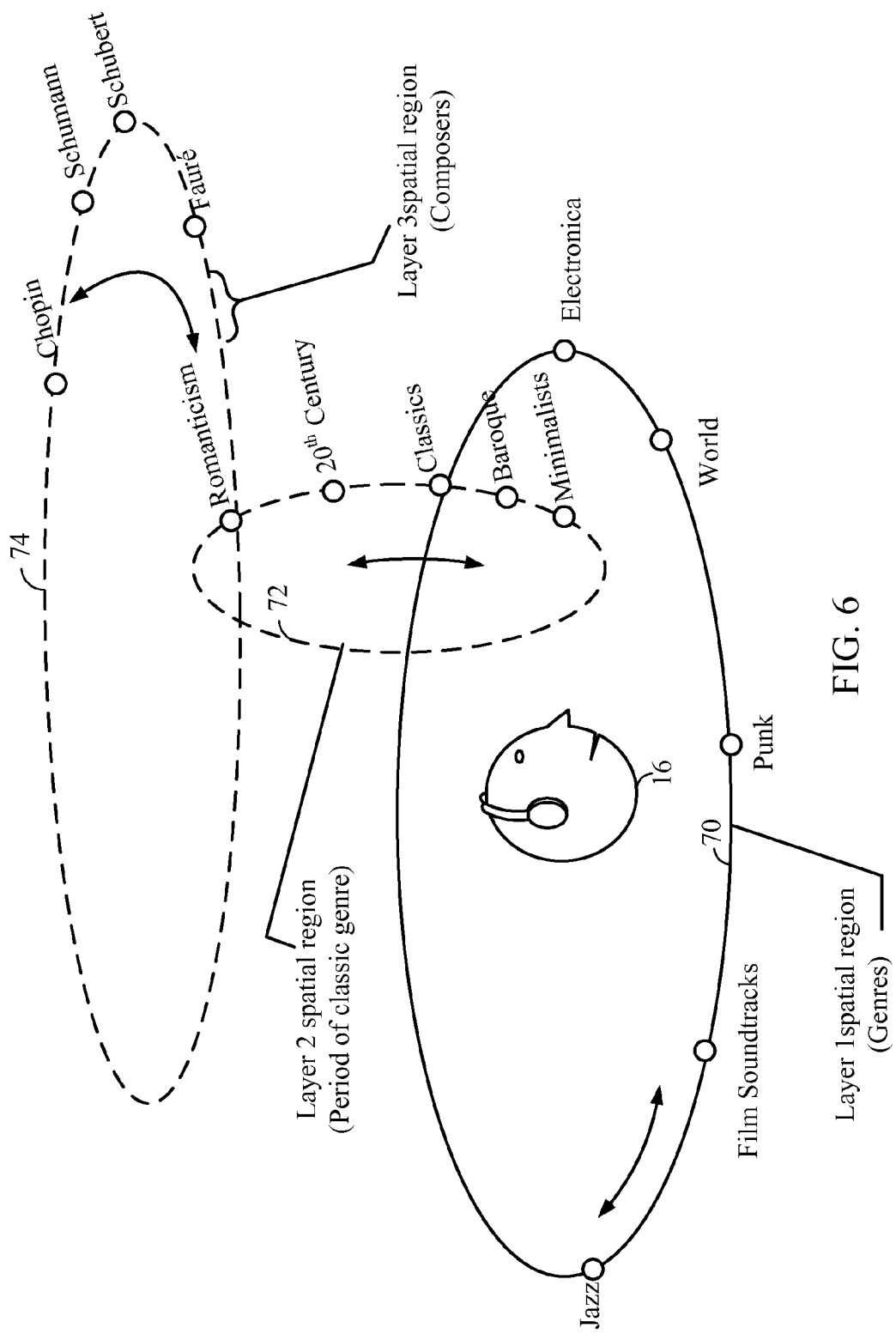
FIG. 6 is a diagram illustrating an exemplary configuration example of spatial auditory cues located in different spatial regions around the user.

FIG. 6 is a diagram illustrating an exemplary configuration example of spatial auditory cues located in different spatial regions around the user. The Layer 1 (Genres) spatial region may be a horizontal spatial region. As illustrated, the categories in Layer 1 may be from a genre, "Punk", "World", "Jazz", "Electronica", "Classic" etc. If the Genres "Classics" is a tag point, then the listener 16 may perceive auditory cues in spatial locations as coming from a vertical spatial region. For example, Layer 2 (Classics) may be a vertical spatial region. The "Classic" category may have sub-categories such as "Minimalists", "Baroque", "20$^{th}$ Century", "Romanticism", etc. If the Classics "Romanticism" subcategory (a category once in Layer 2) is a tag point, the listener may perceive auditory cues in spatial locations as coming from another horizontal spatial region, i.e., Layer 3 (Composers). That is to say, although Layer 1 and Layer 3 may both be horizontal spatial regions, Layer 3 may be offset vertically in space from Layer 1. The auditory cues in Layer 3, may be perceived as if they were located at a higher or lower spatial plane than those of Layer 1. Alternatively, Layer 1 and Layer 3 may be perceived as if they were located in the same spatial place, i.e., not offset vertically in space from each other. Similarly, if Layer 1 and Layer 3 are vertical spatial regions, they may be either be offset horizontally in space from each other or located in the same spatial location.

Figure 7:
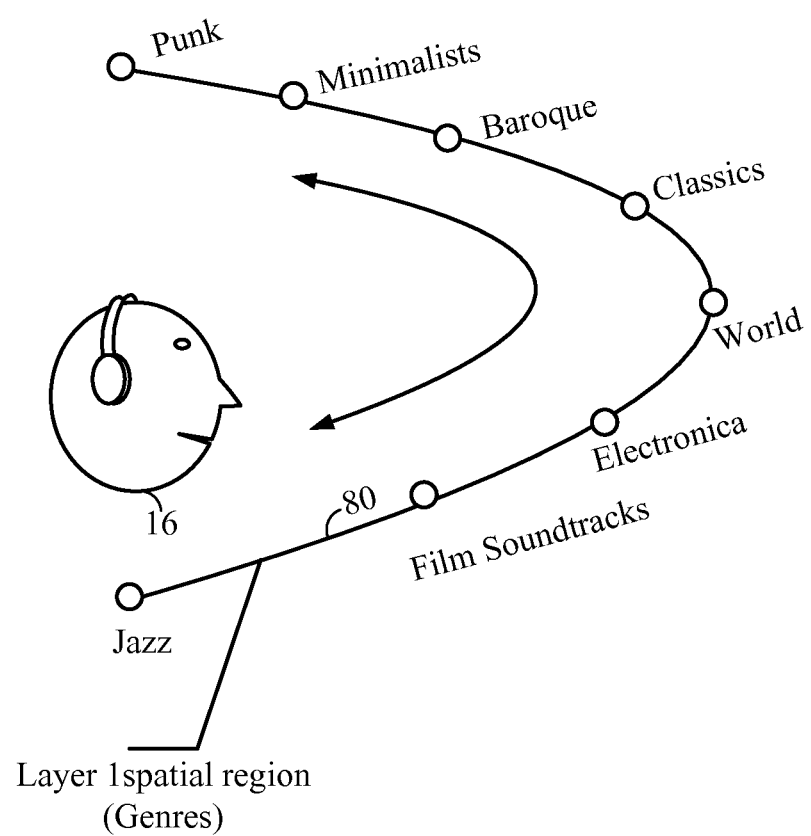
FIG. 7 is a diagram illustrating an exemplary configuration example of a spatial region spanning less than 360 degrees.

It should be noted that in an alternate configuration, auditory cues may be heard in a region that spans less than three-hundred and sixty (360) degrees around the user 16. FIG. 7 is a diagram illustrating an exemplary configuration example of a spatial region spanning less than 360 degrees. For example, the user 16 may prefer to have a narrower auditory space 80. Instead of perceiving auditory cues surrounding the user 16 from zero (0) to three-hundred and sixty (360) degrees, the user 16 may desire to only perceive auditory cues from zero (0) to hundred and eighty-degrees (180), or negative ten (−20) to two-hundred degrees (200), as an example. Except for the different spatial range of degrees, FIG. 7 includes all features and functions previously described. Thus, a Layer 1, Layer 2, or Layer 3 may have a spatial range that is also less than 360 degrees. The same spatial range between layers is not required. Thus, Layer 1, and Layer 2, may have a spatial range of 360 degrees, while Layer 3, has a narrower range. Similarly, Layer 1 may have a narrower range, while either Layer 2, or Layer 3 has a broader spatial range than Layer 1.

Another application of System 10 is to apply a spatial bookmark. Instead of searching items in a list, a song may be played in a spatial region around the user 16. For example, the song may begin at zero (0) degrees, and finish playing at one-hundred and eighty-degrees (180) in a horizontal or vertical region. If the song is paused the user 16 may be able to gauge what percentage of the song is played, instead of looking at the display of the mobile device to see what percentage of the song has played. The spatial bookmark could be "the fading of the song" in a spatial location somewhere between 0 and 180 degrees in the spatial region. The spatial bookmark could also be "silence" in a location in the spatial region. The spatial region may be horizontal, vertical, or off-axis.

Figure 8:
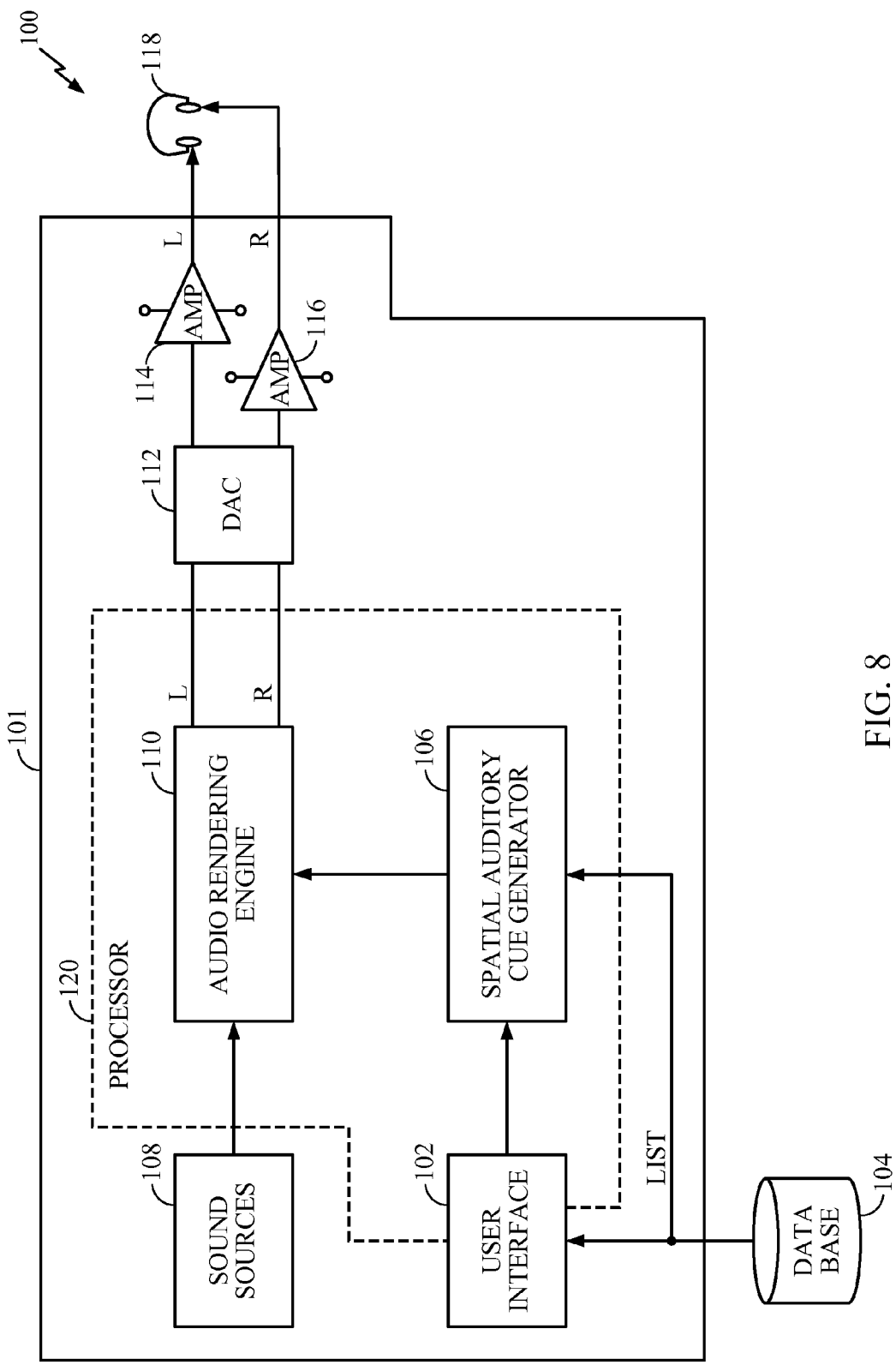
FIG. 8 is a block diagram showing certain components of a first exemplary system for producing spatial auditory cues using headphones.

FIG. 8 is a block diagram showing certain components of a first exemplary system 100 comprising a device 101 for producing spatial auditory cues using headset 118. The system 100 can be configured to implement the functions and features of system 10, described above in connection with FIGS. 1-7.

The system 100 includes the device 101, headset 118, and database 104. The headset 118 may be the same as the headset 14 of FIG. 1.

The database 104 includes any suitable means for storing a database of information, such as a memory, e.g., RAM, ROM, EEPROM, CD-ROM or other optical disk storage, magnetic disk storage or other magnetic storage devices, or any other medium that can be configured to store desired information in the form of data structures that can be accessed by the device 101. The information stored in the database 104 can be any desired type of information, such as media content, contact information, as discussed above, or anything else capable of being organized and collected into a database. Although shown as a separate component in FIGS. 8-10, the database 104 may be alternatively be incorporated into each of the devices 101, 201 301 shown in FIGS. 8-10.

The database 104 provides at least a database index list to the device 101. The index identifies items (i.e., records) stored in the database. For example, the index list may include a number or other symbol uniquely identifying each database item in the list, along with other information about the item, such as a title. The index list may be hierarchically organized or it may be flat. The database 104 may also provide database contents to the device 101, such as stored information or media content, e.g., music or the like, for further processing and/or output by the device 101.

The device 101 may be any device capable of producing audio output and performing the functions disclosed herein. For example, the device 101 may be a handheld device configured, through software programming and/or hardware design, to perform the functions described herein, such as a wireless communication device, for example, a cellular phone, personal digital assistant (PDA) or the like. The device 101 may also be an MP3 player, gaming device, laptop computer, PC, personal stereo, stereo system or the like. The device 101 may be portable or non-portable.

The exemplary device 101 includes a user interface 102, a spatial auditory cue (SAC) generator 106, stored sound sources 108, an audio rendering engine 110, a multi-channel digital-to-analog converter (DAC) 112, and a left-channel amplifier (AMP) 114 and a right-channel amplifier 116 for driving the headset 118. The amplifiers 114, 116 can be headphone high-impedance (HPH) amplifiers.

In the example shown, the SAC generator 106, audio rendering engine 110 and at least a portion of the user interface 102 may be implemented by one or more processors 120 executing programming code. The processor 120 can be a microprocessor, such as an ARM7, digital signal processor (DSP), one or more application specific integrated circuits (ASICs), field programmable gate arrays (FPGAs), complex programmable logic devices (CPLDs), discrete logic, or any suitable combination thereof.

The user interface 102 may include the features and functions of the user interface 21 described in connection with FIG. 1. The user interface 102 receives as input user manipulations of the interface 102 and the database index list from the database 104. As output, the user interface 102 visually displays the database index list to the user so that the list can be browsed, scrolled or otherwise searched, for example, as described in connection with any of FIGS. 1-7. The user interface 102 also generates messages that indicate one or more search actions of a user. These search action messages are output to the SAC generator 106. A search action results from a user using the user interface 102 to search for information stored in the database 104. For example, the search actions can be one or more button pushes at, e.g., push-button switch 28. The button pushes may be either an item-by-item, single-step forward/backward search, or a push-and-hold, fast scrolling forward/backward search. Other types of user search actions may be available through the user interface 102.

The user interface 102 is configured to determine the type of search action, e.g., a single-step search or push-and-hold search; the direction of a user search, e.g., scrolling forward or backward through a displayed database index list; and the currently selected database item being displayed to the user. The user interface 102 monitors the length of time that a user depresses the push button switches to determine the type of search action, and also monitors which one of its switches the user is pressing to determine the direction of the search. The user interface 102 can determine the currently displayed database item by monitoring the item index identifiers corresponding to the user interface display buffer defining the currently selected item on the interface display.

The search action messages are sent to the SAC generator 106 as a result of user search actions. A search action message may be sent for each database item selected (i.e., browsed) by the user interface 102. Thus, as a user scrolls through a displayed list of items, a sequence of search action messages can be output from the user interface 102, with each message being generated when a different database item is displayed as the currently selected item at the user interface 102.

Generally, the search action messages include sufficient information from the user interface 102 to allow the SAC generator 106 to translate the user search actions into one or more spatial auditory cues. For example, each search action message may be a digital signal that includes data fields indicating: 1) the database index identifier of the currently selected database item on the user interface display, 2) the type of user search action, e.g., push-and-hold or single item searching, and 3) the direction of the user search, e.g., scrolling forward or backward through the database index list. Other formats may be used for the search action messages.

The SAC generator 106 translates search actions contained in user interface messages into spatial auditory cues, each of which defines specific location information for a specific auditory cue output by the system 100 through the headset 118. The spatial auditory cues may optionally define the type of sound produced at the specified location. For example, the type of auditory cue sound may be a short audio excerpt, as described above with respect to FIG. 1, or alternatively, a synthesized clicking sound, depending on the speed and type of user search being performed. If the sound type is a short audio excerpt, the sound type may identify the currently selected database item so that the audio rendering engine 110 can retrieve a corresponding audio file from the sound sources database 108, as discussed in further detail below. The SAC generator 106 may be configured to determined sound type based on the search action type field of the search action message. The sound type may also be based on the frequency of search action messages received by the SAC generator 106.

The SAC generator 106 outputs each spatial auditory cue as, for example, a digital signal, which is transferred to the audio rendering engine 110. Each spatial auditory cue may include location, and optionally, the sound type information as fields of the digital signal. A sequence of digital output signals representing a sequence of spatial auditory cues may be produced by the SAC generator 106 as a result of a user search.

To determine a spatial auditory cue for a search action message, the SAC generator 106 first determines a spatial auditory cue corresponding to the currently selected database item being displayed by the user interface 102. This determination may be made based on the database index identifier included in the search action message. Then, for example, if the search action type indicated by the message is a push-and-hold operation, the search action message is translated so that the spatial auditory cues go toward one direction in space (as indicated by the direction field of the search action message) and move continuously, with short clicking sounds being indicated as the output auditory cues. Alternatively, if, for example, the search action type indicated by the message is a single-step, the search action message is translated so that the spatial auditory cues move incrementally and relatively slowly in the direction indicated by the direction field of the search action message.

The SAC generator 106 can be configured to perform a one-to-one mapping, whereby each database item is mapped to a corresponding spatial auditory cue (i.e., a specific location in the auditory space). Alternatively, the SAC generator 106 can be configured to perform a many-to-one mapping, whereby a plurality of database items are mapped to each spatial auditory cue, and thus, a single location in the auditory space may represent more than one database item.

The audio rendering engine 110 generates audio output signals based on the spatial auditory cue location and optional sound type information produced by the SAC generator 106. The audio rendering engine 100 implements the spatial movement and localization of the audio output by applying one or more HRTF filters to input audio signals and processing them. For example, a continuous movement of sound can be implemented by filtering sounds with HRTF filters and quickly interpolating different HRTF coefficients as time passes. The location information provided by the spatial auditory cues may be applied to the HRTF filters to create the perception of the audio output moving or emanating from a particular location. Thus, the spatial auditory cues from the SAC generator 106 may be rendered so that a listener perceives the audio output from the headset 118 as moving through the predetermined space, as the list of database items is scrolled using the user interface 102. As input, the audio rending engine 110 receives audio signals from the sound sources database 108 and spatial auditory cues from the SAC generator 106. The audio rendering engine 110 outputs PCM audio on left and right audio channels to the DAC 112.

The stored sound sources 108 may be a database of audio excerpts, recorded sounds, synthesized sounds or the like that are provided as input audio signals to the audio rendering engine 110. The sound sources may be stored in different audio formats, such as MIDI, MP3, AAC, WAV files or the like. The audio rendering engine 110 can convert the sound sources into appropriate formats that can be played on the headset 118. The format of the sound sources is typically uncompressed pulse code modulated (PCM) data before they are processed by the audio rendering engine 110. Sound sources that are MIDI, MP3, AAC, WAV or other formats can be decoded into PCM data by the audio rendering engine 110. The PCM data are filtered by the audio rendering engine 110 using, for example, HRTF filters. The specific location at which the output sound sources are perceived by a listener is determined by design of the spatial auditory cues.

The DAC 112 includes a left channel DAC (not shown) and right-channel DAC (not shown). The left-channel DAC converts left-channel digitized audio output from the audio rendering engine 110 into a left-channel analog audio signal. The left channel analog audio signal is then amplified by the left-channel audio amplifier 114 to drive the left speaker of the headset 118. The right-channel DAC converts right-channel digitized audio output from the audio rendering engine 110 into a right-channel analog audio signal. The right-channel analog audio signal is then amplified by the right-channel audio amplifier 116 to drive the right speaker of the headset 118.

One of ordinary skill in the art will understand that additional analog audio processing circuitry (not shown), beyond the audio amplifiers 114,116, may be included in the device 101.

The left and right headset speakers are any suitable audio transducer for converting the electronic signals output from the amplifiers 114,116, respectively, into sound.

Figure 9:
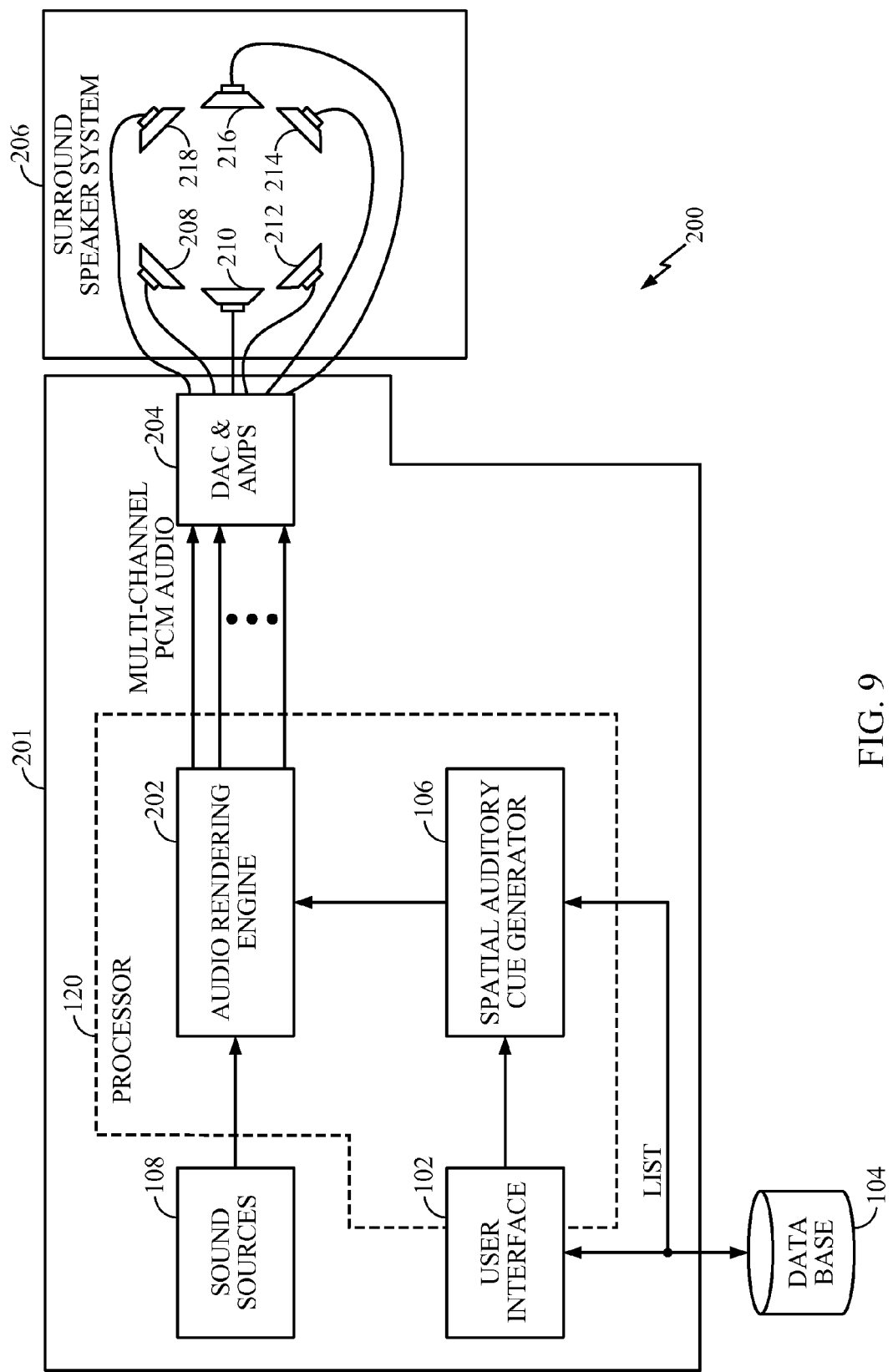
FIG. 9 is a block diagram of showing certain components of a second exemplary system for producing spatial auditory cues using a surround speaker system.

FIG. 9 is a block diagram of showing certain components of a second exemplary system 200 comprising a device 201 for producing spatial auditory cues using a surround speaker system 206. The system 200 can be configured to implement the functions of system 10, described above in connection with FIGS. 1-7.

The system 200 includes the device 201, surround speaker system 206, and database 104. Although shown as separate components, in an alternative configuration, the database 104 and/or the surround speaker system 206 may be incorporated into the device 201.

The device 201 may be any device capable of producing audio output and performing the functions disclosed herein. For example, the device 201 may be a handheld device configured, through software programming and/or hardware design, to perform the functions described herein, such as a wireless communication device, for example, a cellular phone, personal digital assistant (PDA) or the like. The device 201 may also be an MP3 player, gaming device, laptop computer, PC, personal stereo, stereo system or the like. The device 201 may be portable or non-portable.

The device 201 includes the user interface 102, the SAC generator 106, the sound sources 108, an audio rendering engine 202, and a multi-channel digital-to-analog converter (DAC) and amplifiers (AMPS) 204 that output audio signals to the surround sound speaker system 206. In the example shown, the SAC generator 106, audio rendering engine 202 and at least a portion of the user interface 102 may be implemented by the processor 120 executing programming code.

The audio rendering engine 202 performs most of the functions of the audio rending engine 110 shown in FIG. 8. The primary difference between the audio rendering engines 110, 202 is that the audio rendering engine 202 of FIG. 8 produces audio output signals for the speaker array 208-218, instead of a headset, such as the headset 118. Thus, the rendering engine 202 in FIG. 8 may include a volume panner or other speaker-based algorithms for locating audio output, in addition to or instead of HRTF filter algorithms. As input, the audio rending engine 202 receives audio signals from the sound sources database 108 and spatial auditory cues from the SAC generator 106. The audio rendering engine 202 outputs PCM audio on multiple audio channels to the DAC 204.

The DAC & AMPS 204 include DACs and audio amplifiers for each output audio channel. In the example shown, there are six output audio channels, one for each of the speakers 208-218. Any other suitable number of audio channels and speakers many also be used. Each channel DAC converts digitized PCM audio output from the audio rendering engine 202 into an analog audio signal, which is then provided to a corresponding channel amplifier. The audio amplifiers may be commercially-available audio amplifiers. Each audio amplifier drives a corresponding speaker 208-218 of the surround speaker system 206.

One of ordinary skill in the art will understand that additional analog audio processing circuitry (not shown), beyond the audio amplifiers may be included in the device 201 and/or surround speaker system 206.

The surround speaker system 206 provides multiple speakers 208-218 that physically surround a listener. The speakers 208-218 are any suitable audio transducers for converting the electronic signals output from the amplifiers, respectively, into sound.

Figure 10:
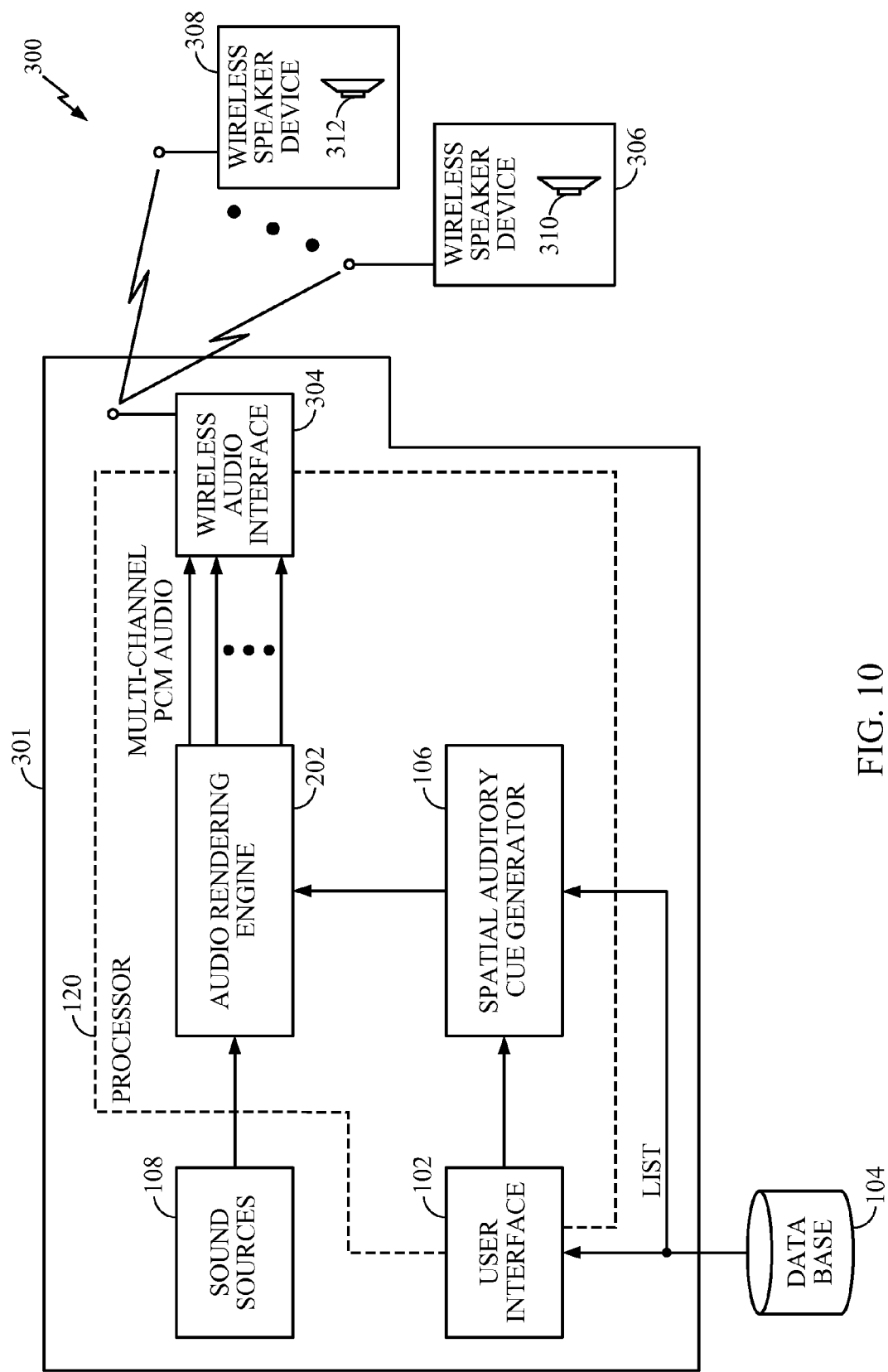
FIG. 10 is a block diagram showing certain components of a third exemplary system for producing spatial auditory cues using wireless speakers.

FIG. 10 is a block diagram showing certain components of a third exemplary system 300 comprising a device 301 for producing spatial auditory cues using wireless speaker devices 306, 308. The system 300 can be configured to implement the functions of system 10, described above in connection with FIGS. 1-7.

The system 300 includes the device 301, wireless speakers 306,308 and database 104. Although shown as separate components, in an alternative configuration, the database 104 may be incorporated into the device 301.

The device 301 may be any device capable of producing audio output and performing the functions disclosed herein. For example, the device 301 may be a handheld device configured, through software programming and/or hardware design, to perform the functions described herein, such as a wireless communication device, for example, a cellular phone, personal digital assistant (PDA) or the like. The device 301 may also be an MP3 player, gaming device, laptop computer, PC, personal stereo, stereo system or the like. The device 301 may be portable or non-portable.

The device 301 includes the user interface 102, the SAC generator 106, the sound sources 108, the audio rendering engine 202, a wireless audio interface 304 that outputs audio signals to one or more wireless speaker devices 306, 308. In the example shown, the SAC generator 106, audio rendering engine 202, at least a portion of the user interface 102, and at least a portion of the wireless audio interface 304 may be implemented by the processor 120 executing programming code.

The audio rendering engine 202 outputs two or more channels of PCM audio to the wireless interface 304.

The wireless interface 304 includes a transceiver and provides wireless communications with the wireless speaker devices 306, 308. Although any suitable wireless technology can be employed with the device 301, the wireless interface 304 preferably includes a commercially-available Bluetooth module that provides at least a Bluetooth core system consisting of an antenna, a Bluetooth RF transceiver, baseband processor, protocol stack, as well as hardware and software interfaces for connecting the module to the audio rendering engine 202 and other components, if required, of the device 301.

The PCM audio signals can be transmitted over wireless channels to the speaker devices 308, 310 using, for example, protocols as defined by the Bluetooth Specification available at www.bluetooth.com. The Bluetooth Specification provides specific guidelines for transmitting audio signal. In particular, the Bluetooth Specification provides the Advanced Audio Distribution Profile (A2DP) that defines protocols and procedures for wirelessly distributing high-quality stereo or mono audio over a Bluetooth network. The A2DP may be used with the system 300.

The speaker devices 306, 308 may be commercially-available Bluetooth speakers. Each speaker device 306, 308 includes a wireless interface (not shown) for receiving the audio signals transmitted from the device's wireless interface 304 and a speaker 310, 312. The speaker devices 306, 308 also each include DACs, audio amplifiers (not shown) and other audio processing circuitry for converting the PCM audio into analog audio signals for output on the speakers 310, 312. Any suitable number of speaker devices may be used.

The functions and features of devices 101, 201 and 301 shown in FIGS. 8-10, respectively, can be combined into a single device configured to have multiple, and optionally selectable, output interfaces for providing the spatial audio output signals to the headset 118, surround sound speaker system 206, and wireless speaker devices 306, 308, respectively rendered and formatted.

FIG. 10 is a block diagram showing certain software and hardware components of a system architecture 400 for producing spatial auditory cues. The system architecture 400 can be used to implement the functions involved in generating the spatial audio output signals of any of the devices 10, 101, 201, and 301, or any combination thereof, described above in connection with FIGS. 1-10.

The system architecture 400 includes one or more processors, such as the processor 120, connected by one or more digital buses 403 to a memory 402, user interface (UI) hardware 401, a wireless interface 404, and a multi-channel DAC 406. The UI hardware 401 may include the display 18 and push button 28, as well as other hardware for providing a user interface. The output of the multi-channel DAC 406 is provided to, among other things, a plurality of audio amplifiers 408, 410, which in turn produce spatial audio output.

As described above in connection with FIG. 8, the processor 120 can be a microprocessor, such as an ARM7, digital signal processor (DSP), one or more application specific integrated circuits (ASICs), field programmable gate arrays (FPGAs), complex programmable logic devices (CPLDs), discrete logic, or any suitable combination thereof.

The memory 402 stores the sound sources 108, SAC generator software code 414, audio rendering engine software code 416, user interface software code 418, and database interface software code 412. Although not shown, the memory 402 may also store the database 104, and in addition, controller software executable by the processor 120 for controlling overall operation of the system. The software code 412-418 is executable by the processor 120.

The database software code 412, when executed by the processor 120, provides a database interface that permits access to the contents of the database 104 and its item index list. The database software 412 can provide the index list to the user interface 401 for display and other uses.

The SAC generator software code 414, when executed by the processor 120, provides the functionality of the SAC generator 106.

The audio render engine software code 416, when executed by the processor 120, provides the functionality of any of the audio rendering engines 110, 202 described herein.

The user interface software code 418, when executed by the processor 120 in conjunction with the user interface (UI) hardware 401, provides the functionality of user interface 102 described herein.

Figure 11:
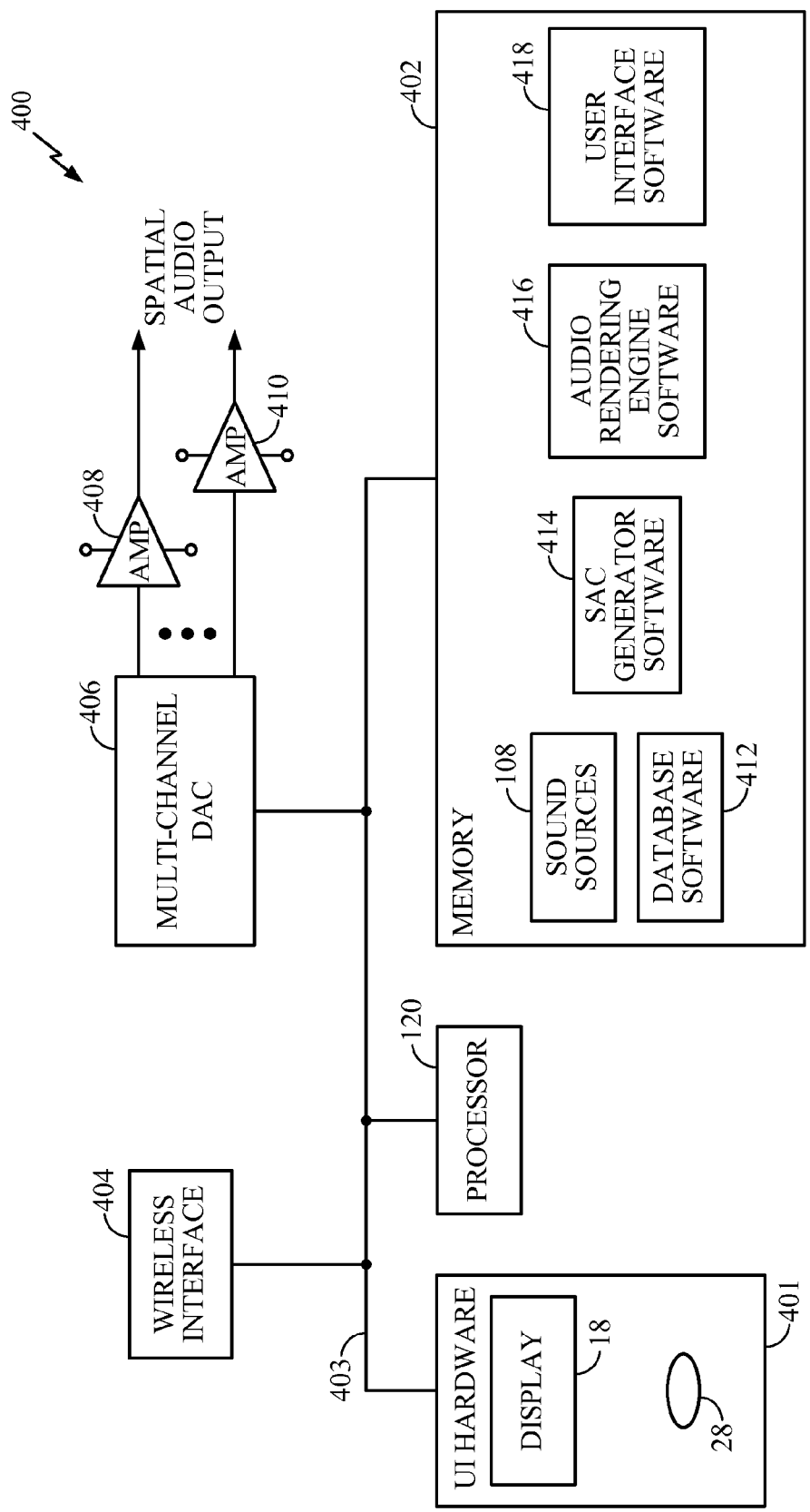
FIG. 11 is a block diagram showing certain exemplary software and hardware components for producing spatial auditory cues.

Although shown a separate software programs in FIG. 11, the software code 412-418 may be combined together into fewer software programs.

The multi-channel DAC 406 includes a DAC for each output audio channel. Each channel DAC converts digitized PCM audio output into an analog audio signal, which is then provided to a corresponding channel audio amplifier 408, 410. The audio amplifiers may be commercially-available audio amplifiers and/or HPH amplifiers. Any suitable number of audio channels, DACs and AMPs many be included in the architecture 400.

One of ordinary skill in the art will understand that additional analog audio processing circuitry (not shown), beyond the audio amplifiers may be included in the architecture 400.

The wireless interface 404 includes a transceiver and provides wireless communications with audio output device, such as the wireless speaker devices 306, 308 or a wireless headset. Although any suitable wireless technology can be employed for the wireless interface 404, the wireless interface 404 preferably includes a commercially-available Bluetooth module that provides at least a Bluetooth core system consisting of an antenna, a Bluetooth RF transceiver, baseband processor, protocol stack, as well as hardware and software interfaces for connecting the module to the processor 120 and other components, if required, of the architecture 400.

PCM audio signals can be transmitted through the wireless interface 404 using, for example, protocols as defined by the Bluetooth Specification available at www.bluetooth.com.

The Bluetooth Specification provides specific guidelines for transmitting audio signal. In particular, the Bluetooth Specification provides the Advanced Audio Distribution Profile (A2DP) that defines protocols and procedures for wirelessly distributing high-quality stereo or mono audio over a Bluetooth network. The A2DP may be used with the architecture 400.

Figure 12:
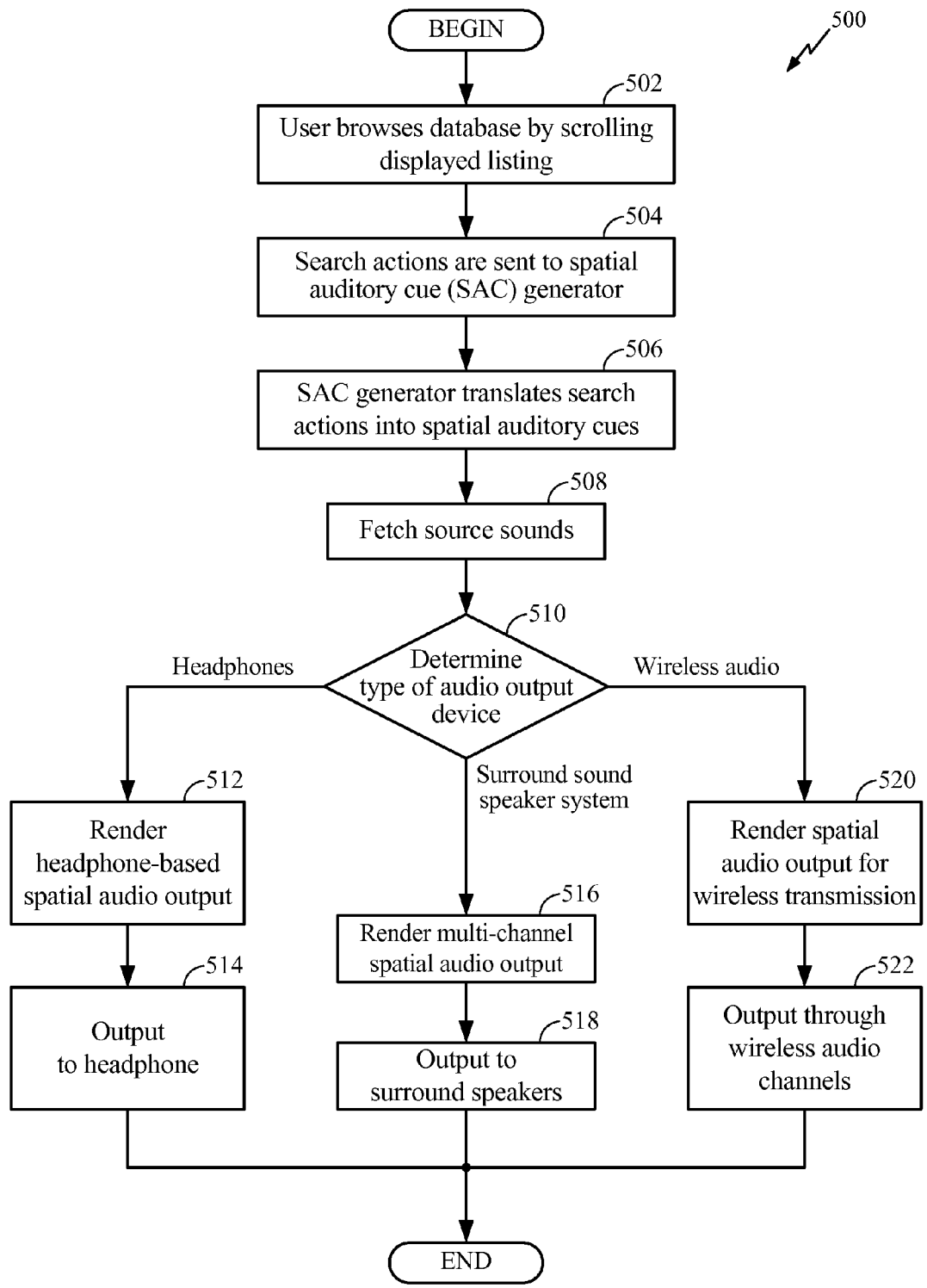
FIG. 12 is a flowchart illustrating an exemplary method of producing spatial auditory cues.

FIG. 12 is a flowchart 500 illustrating a method of producing spatial auditory cues. In block 502, a user browses the database contents by scrolling a listing, e.g., list 19 on a display, e.g., display 18, using a user interface, e.g., user interface 21 or 102.

In block 504, one or more search actions produced as a result of the user browsing are sent from the user interface to the SAC generator 106. The search actions may be described in a search action message, as discussed above in connection with FIG. 8.

In block 506, the SAC generator 106 translates the search actions into spatial auditory cues. Each spatial auditory cue corresponds to a particular location within the listener space 20. The spatial auditory cue selected for a particular search action is chosen from a plurality of spatial auditory cues corresponding to a plurality of locations within the listener space. Each of the spatial auditory cues corresponds to a respective, distinct location within the listener space.

In block 508, an audio rendering engine, e.g., either of the audio rendering engines 110, 202, fetches sound sources corresponding to the spatial auditory cues. The particular sound source that is fetched may be determined from the sound type field of the spatial auditory cue.

In decision block 510, the rendering engine determines the type of audio output device for which the spatial audio cues are to be rendered. In the example disclosed herein, the audio output device may be a headset, surround speaker system, or wireless speaker system.

If the audio output device is a headset, the method proceeds to block 512, and the audio rendering engine renders the spatial auditory cues as headphone-based spatial audio output signals. In block 514, the spatial audio output signals are output to headphone speakers within a headset.

If the audio output device is a surround sound speaker system, the method proceeds to block 516, and the audio rendering engine renders the spatial auditory cues as multi-channel spatial audio output signals. In block 518, the spatial audio output signals are output to the surround sound speakers.

If the audio output device is one or more wireless audio speakers, the method proceeds to block 520, and the audio rendering engine renders the spatial auditory cues as digitized spatial audio output signals suitable for transmission over one or more wireless channels. In block 522, the digitized spatial audio output signals are output through the wireless channels.

The functionality of the systems, devices, headsets and their respective components, as well as the method steps and blocks described herein may be implemented in hardware, one or more digital circuits executing software and/or firmware, or any suitable combination thereof. The software/firmware may be a program having sets of instructions (e.g., code segments) executable by one or more digital circuits, such as microprocessors, DSPs, embedded controllers, or intellectual property (IP) cores. The software/firmware may be stored as instructions or code on one or more computer-readable media. Computer-readable medium includes a computer storage medium. A storage medium may be any available medium that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium.

Certain embodiments have been described. However, various modifications to these embodiments are possible, and the principles presented herein may be applied to other embodiments as well. For example, the principles disclosed herein may be applied to devices other than those specifically described herein. In addition, the various components and/or method steps/blocks may be implemented in arrangements other than those specifically disclosed without departing from the scope of the claims. Thus, other embodiments and modifications will occur readily to those of ordinary skill in the art in view of these teachings. Therefore, the following claims are intended to cover all such embodiments and modifications when viewed in conjunction with the above specification and accompanying drawings.

What is claimed is:

1. A method of producing one or more auditory cues, comprising:
   mapping a plurality of items in a database list to a plurality of spatial auditory cues corresponding to a plurality of locations within a predetermined physical space, wherein each of the spatial auditory cues is for generating sound perceivable by a user at a respective, distinct location within the predetermined space;
   receiving a search action at a user interface included in a device;
   translating the search action into at least one of the spatial auditory cues; and
   rendering the at least one spatial auditory cue as an audio output signal.

2. The method of claim 1, wherein the search action results from a user searching for an item stored in a database.

3. The method of claim 1, further comprising: scrolling through a list of items stored in a database to generate the search action.

4. The method of claim 1, wherein the device is a wireless communication device.

5. The method of claim 1, further comprising: selecting an auditory cue from a plurality of sound sources, based on at least one spatial auditory cue.

6. The method of claim 1, further comprising: determining a type of audio output device for receiving the audio output signal.

7. The method of claim 1, wherein at least one spatial auditory cue is a tag point.

8. The method of claim 7, wherein the tag point is rendered into a different sound indicating a selected property of an item.

9. The method of claim 1, wherein the predetermined space comprises at least one of a vertical spatial region, horizontal spatial region, and off-axis spatial region.

10. The method of claim 1, wherein a category is browsed in a list in an initial spatial region, and once the category is selected a sub-category is browsed in a list in a different spatial region.

11. The method of claim 10, wherein the initial spatial region and the different spatial region are offset in space.

12. A method of interfacing with a database, comprising:
    visually displaying on a device at least a portion of a scrollable list of items stored in the database;
    mapping at least some of the items to a plurality of spatial auditory cues corresponding to a plurality of locations within a predetermined space, wherein each of the spatial auditory cues corresponds to a respective, distinct location within the predetermined space;
    scrolling the list of items; and
    rendering at least one of the spatial auditory cues as an audio output signal as a result of the scrolling.

13. The method of claim 12, wherein rendering includes rendering a plurality of the spatial auditory cues so that a user perceives the audio output moving through the predetermined space as the list of items is scrolled.

14. The method of claim 12, wherein mapping includes mapping a plurality of the items to each spatial auditory cue.

15. An apparatus, comprising:
    a user interface configured to receive a search action;
    a spatial auditory cue generator configured to map a plurality of items in a database list to a plurality of spatial auditory cues corresponding to a plurality of locations within a predetermined physical space, wherein each of the spatial auditory cues is for generating sound perceivable by a user at a respective, distinct location within the predetermined space, and to translate the search action into at least one of the spatial auditory cues; and
    an audio rendering engine configured to render the at least one spatial auditory cue as audio output.

16. The apparatus of claim 15, further comprising: a database of information, wherein the search action results from a user searching for information stored in the database.

17. The apparatus of claim 15, wherein the user interface includes: a graphical interface for visually scrolling through a list of items stored in a database to generate the search action.

18. The apparatus of claim 15, further comprising: a processor configured to select audio output content from a plurality of sound sources, based on at least one spatial auditory cue.

19. The apparatus of claim 15, further comprising: a surround speaker system responsive to the audio output.

20. The apparatus of claim 15, further comprising: a wireless interface configured to transmit the audio output over one or more wireless channels.

21. The apparatus of claim 20, further comprising: at least one wireless speaker device responsive to the audio output transmitted over the wireless channels.

22. The apparatus of claim 15, wherein at least one spatial auditory cue is a tag point.

23. The apparatus of claim 22, wherein the tag point is rendered into a different sound indicating a selected property of an item.

24. The apparatus of claim 15, wherein a category is browsed in a list in an initial spatial region, and once the category is selected a sub-category is browsed in a list in a different spatial region.

25. The apparatus of claim 24, wherein the initial spatial region and the different spatial region are offset in space.

26. An apparatus, comprising:
    means for mapping a plurality of items in a database list to a plurality of spatial auditory cues corresponding to a plurality of locations within a predetermined physical space, wherein each of the spatial auditory cues is for generating sound perceivable by a user at a respective, distinct location within the predetermined space;
    means for receiving a search action;
    means for translating the search action into at least one of the spatial audio cues; and means for rendering the at least one spatial auditory cue as an audio output signal.

27. The apparatus of claim 26, further comprising: means for storing information, wherein the search action results from a user searching the stored information.

28. The apparatus of claim 26, wherein the receiving means includes: means for visually scrolling through a list of items stored in a database to generate the search action.

29. The apparatus of claim 26, further comprising: means for selecting audio output content from a plurality of sound sources, based on at least one spatial auditory cue.

30. The apparatus of claim 26, wherein at least one spatial auditory cue is a tag point.

31. The apparatus of claim 30, wherein the tag point is rendered into a different sound indicating a selected property of an item.

32. The apparatus of claim 26, wherein a category is browsed in a list in an initial spatial region, and once the category is selected a sub-category is browsed in a list in a different spatial region.

33. The apparatus of claim 26, wherein the initial spatial region and the different spatial region are offset in space.

34. A non-transitory computer-readable medium embodying a set of instructions executable by one or more processors, comprising:
   code for mapping a plurality of items in a database list to a plurality of spatial auditory cues corresponding to a plurality of locations within a predetermined physical space, wherein each of the spatial auditory cues is for generating sound perceivable by a user at a respective, distinct location within the predetermined space;
   code for receiving a search action at a user interface included in a device;
   code for translating the search action into at least one of the spatial auditory cues; and
   code for rendering the at least one spatial auditory cue as audio output.

35. The computer-readable medium of claim 34, further comprising: code for storing information, wherein the search action results from a user searching the stored information.

36. The computer-readable medium of claim 34, further comprising: code for visually scrolling through a list of items stored in a database to generate the search action.

37. The computer-readable medium of claim 34, further comprising: code for selecting the audio output content from a plurality of sound sources, based on at least one spatial auditory cue.

38. The computer-readable medium of claim 34, wherein at least one spatial auditory cue is a tag point.

39. The computer-readable medium of claim 38, wherein the tag point is rendered into a different sound indicating a selected property of an item.

40. The computer-readable medium of claim 34, wherein a category is browsed in a list in an initial spatial region, and once the category is selected a sub-category is browsed in a list in a different spatial region.

41. The computer-readable medium of claim 34, wherein the initial spatial region and the different spatial region are offset in space.

* * * * *